No. 612,747. Patented Oct. 18, 1898.
F. O. McCASKEY.
PICTURE FRAME.
(Application filed Dec. 10, 1897.)
(No Model.)
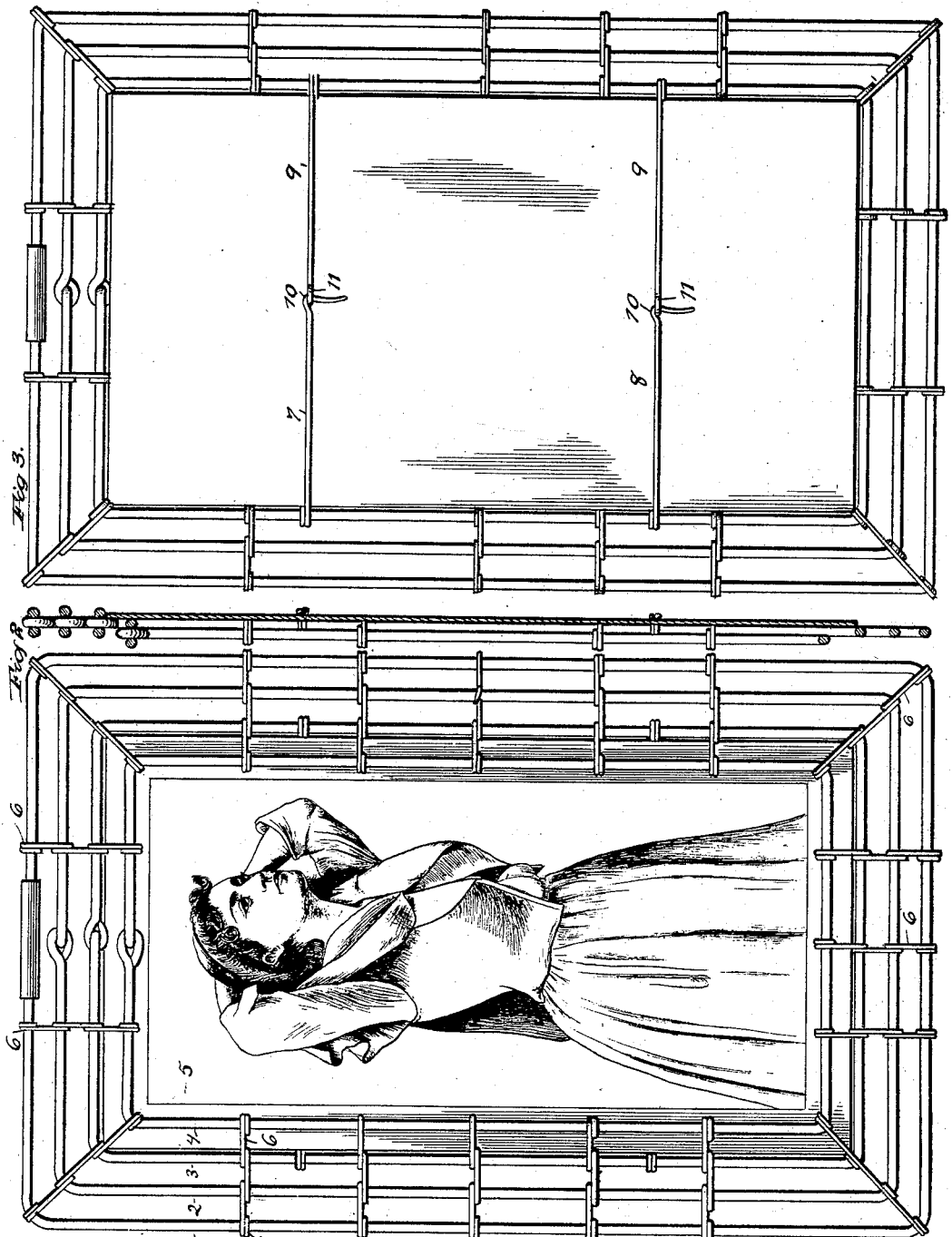
Witnesses
Victor J. Evans
Harry L. Ames.
Inventor
Franklin O. McCaskey.
by V. T. Stockbridge
his Attorney.

UNITED STATES PATENT OFFICE.

FRANKLIN O. McCASKEY, OF OGDEN, IOWA.

PICTURE-FRAME.

SPECIFICATION forming part of Letters Patent No. 612,747, dated October 18, 1898.

Application filed December 10, 1897. Serial No. 661,423. (No model.)

*To all whom it may concern:*

Be it known that I, FRANKLIN O. MCCASKEY, a citizen of the United States, residing at Ogden, in the county of Boone and State of Iowa, have invented certain new and useful Improvements in Picture-Frames; and I do hereby declare the following to be a full, clear, and exact description of the invention, such as will enable others skilled in the art to which it appertains to make and use the same.

This invention relates to picture frames or holders; and the object in view is to provide a simple, cheap, and economical article of the character referred to which has combined therewith means for securing a picture or photograph within the frame in such manner that it may be readily removed therefrom and replaced by another when desired.

The detailed objects and advantages of the invention will be pointed out in the course of the subjoined description.

The invention consists in an improved picture frame or holder embodying certain novel features and details of construction and arrangement of parts, as hereinafter fully described, illustrated in the drawings, and incorporated in the claims.

In the accompanying drawings, Figure 1 is a front elevation of the improved picture-frame. Fig. 2 is a central longitudinal section through the same. Fig. 3 is a rear elevation of the frame.

Similar numerals of reference designate corresponding parts in all the views.

The improved picture frame or holder contemplated in this invention comprises a clustered or nested series of subsidiary frames 1, 2, 3, and 4, 1 designating the outer or marginal frame and 4 the inner frame, through which the picture at 5 is exposed.

The several frames above referred to are arranged in such manner that their sides are all parallel to each other. The frame as a whole may be said to be composed of a series of frames of different sizes, progressively decreasing in size from the outer or marginal frame to the inner frame, through which the picture is exposed. Any number of these frames may be employed, according to the size of the completed holder or frame, and the said several frames are interconnected by means of binding-wires 6, the outer ends of which are coiled around the outer frame and the inner ends around the inner frame, the intermediate portions of said wires being coiled around the intermediate frames, thus securely holding all of the frames together.

Each of the frames is preferably composed of wire bent into the form of a rectangular frame, the ends being secured by hooking the same together or by placing a ferrule over the meeting ends and securing the same in any convenient manner. It is also within the scope of this invention to nickel-plate or gild the wires or give the same any other desired ornamental finish.

All of the several frames, with the exception of the innermost frame, are preferably arranged in a common plane. The innermost frame is located slightly in advance of the next adjacent frame, so as to form a space in which the picture or photograph may be received, the said picture bearing against the innermost frame and being entirely included in the next adjacent frame. The picture is held in place by means of one or more sets of securing-wires 7 and 8, 7 designating a piece of wire, which is coiled around a second frame, and thus pivotally connected thereto, and also provided at its free or swinging end with an eye 10. The other wire 9 is secured to the frame in a similar manner and is provided at its free end with a hook 11 to pass through the eye of the complemental portion of the fastening device. One, two, or more sets of fastening-wires may be employed, according to the size of the frame and the nature of the picture or photograph to be held. The flexibility of the fastening-wires enables the ends thereof to be hooked together.

From the foregoing description it will be seen that I have provided a simple, strong, and economical picture frame or holder which may be manufactured economically and which will provide for the instant removal and application of pictures or photographs. It will of course be understood that the frame is susceptible of changes in the form, proportion, and minor details of construction, which may be resorted to without departing from the spirit or sacrificing any of the advantages of the invention.

Having thus described my invention, what I claim as new, and desire to secure by Letters Patent, is—

1. A picture-holder, consisting of a series of frames each composed of a piece of wire the ends of which are hooked together, said frames being arranged one within the other and having their sides in parallel relation, the said frames, with the exception of the inner one, being in a common plane and all of the frames being interconnected by means of binding wires or stays, the inner frame being arranged slightly out of line with the other frames to form a seat or rest for the picture, substantially as described.

2. A picture-holder, embodying a nested series of frames interconnected by binding wires or stays, in combination with one or more sets of securing-wires pivotally connected to one of the frames and provided respectively with eyes and hooks whereby they may be interlocked in rear of the inserted picture, substantially as described.

In testimony whereof I have signed this specification in the presence of two subscribing witnesses.

FRANKLIN O. McCASKEY.

Witnesses:
JULIUS KUNST,
GORDON E. SACHER.